(12) United States Patent
Brummel et al.

(10) Patent No.: US 11,172,016 B2
(45) Date of Patent: Nov. 9, 2021

(54) DEVICE, METHOD AND SYSTEM TO ENFORCE CONCURRENCY LIMITS OF A TARGET NODE WITHIN A NETWORK FABRIC

(71) Applicant: Intel Corporation, Santa Clara, CA (US)

(72) Inventors: Karl P. Brummel, Chicago, IL (US);
Charles A. Giefer, Seattle, WA (US);
Nathan S. Miller, Seattle, WA (US);
Keith D. Underwood, Powell, TN (US)

(73) Assignee: Intel Corporation, Santa Clara, CA (US)

(*) Notice: Subject to any disclaimer, the term of this patent is extended or adjusted under 35 U.S.C. 154(b) by 1005 days.

(21) Appl. No.: 15/474,833

(22) Filed: Mar. 30, 2017

(65) Prior Publication Data

US 2018/0287904 A1    Oct. 4, 2018

(51) Int. Cl.
*H04L 29/08*      (2006.01)
*H04L 12/801*     (2013.01)
(Continued)

(52) U.S. Cl.
CPC .......... *H04L 67/10* (2013.01); *H04L 47/24* (2013.01); *H04L 47/27* (2013.01); *H04L 47/30* (2013.01);
(Continued)

(58) Field of Classification Search
CPC ......... H04L 67/10; H04L 47/34; H04L 47/32; H04L 47/24; H04L 47/27; H04L 47/30; H04L 47/10
See application file for complete search history.

(56) References Cited

U.S. PATENT DOCUMENTS 5,151,899 A    9/1992  Thomas et al.
6,115,749 A *  9/2000  Golestani ............ H04L 12/1868
                                                    370/229
(Continued)

FOREIGN PATENT DOCUMENTS

EP    2290904 A1     3/2011
WO    2017112241 A1  6/2017
WO    2017112341 A1  6/2017

OTHER PUBLICATIONS

International Search Report and Written Opinion issued in PCT Application No. PCT/US2016/063275, dated Mar. 3, 2017, 8 pages.
(Continued)

*Primary Examiner* — Philip C Lee
(74) *Attorney, Agent, or Firm* — Patent Capital Group (57) ABSTRACT

A computing device, a method, and a system to enforce concurrency limits within a network fabric. The computing device includes a memory device; and a network interface controller coupled to the memory device. The network interface controller includes circuitry to communicate with a plurality of target computing devices in a network fabric. The circuitry is configured to generate packets for transmission to respective ones of a plurality of target nodes. For each packet addressed to its corresponding target node, the circuitry is to determine whether transmitting the packet would violate the target node's concurrency limit. If transmitting the packet would not violate the target node's concurrency limit, the circuitry is to transmit the packet to the target node. However, if transmitting the packet would violate the target node's concurrency limit, the circuitry would store the packet in a retransmit buffer of the computing device, where the retransmit buffer is to further store already transmitted packets flagged for retransmission. The circuitry would then transmit the packet from the retransmit (Continued)

buffer when transmitting the packet from the retransmit buffer would not violate the target node's concurrency limit.

25 Claims, 4 Drawing Sheets

(51) Int. Cl.
    *H04L 12/823*     (2013.01)
    *H04L 12/851*     (2013.01)
    *H04L 12/807*     (2013.01)
    *H04L 12/835*     (2013.01)

(52) U.S. Cl.
    CPC .............. *H04L 47/32* (2013.01); *H04L 47/34* (2013.01); *H04L 47/10* (2013.01)

(56) References Cited

U.S. PATENT DOCUMENTS

| | | | |
|---|---|---|---|
| 6,438,101 B1* | 8/2002 | Kalampoukas | H04L 47/10 370/229 |
| 7,852,846 B2 | 12/2010 | Favor et al. | |
| 7,957,288 B2 | 6/2011 | Georgiou et al. | |
| 8,792,495 B1 | 7/2014 | Dixon et al. | |
| 8,923,129 B1 | 12/2014 | Yuan et al. | |
| 10,277,518 B1* | 4/2019 | Matthews | H04L 47/56 |
| 2001/0017844 A1* | 8/2001 | Mangin | H04L 69/163 370/231 |
| 2007/0208820 A1 | 9/2007 | Makhervaks et al. | |
| 2007/0299963 A1 | 12/2007 | DeCusatis et al. | |
| 2011/0103256 A1* | 5/2011 | Gerber | H04L 43/08 370/253 |
| 2011/0103403 A1 | 5/2011 | Derom et al. | |
| 2012/0257617 A1 | 10/2012 | Bugenhagen et al. | |
| 2016/0308775 A1* | 10/2016 | Kojima | H04L 47/193 |
| 2017/0180265 A1 | 6/2017 | Underwood et al. | |
| 2017/0187637 A1* | 6/2017 | Underwood | H04L 1/187 |
| 2018/0254979 A1* | 9/2018 | Scahill | H04L 47/193 |
| 2019/0334825 A1* | 10/2019 | Nadas | H04L 47/263 |

OTHER PUBLICATIONS

International Search Report and Written Opinion issued in PCT Application No. PCT/US2016/063783, dated Apr. 28, 2017, 16 pages.

* cited by examiner

DEVICE, METHOD AND SYSTEM TO ENFORCE CONCURRENCY LIMITS OF A TARGET NODE WITHIN A NETWORK FABRIC

BACKGROUND

Modern computing devices have become ubiquitous tools for personal, business, and social uses. Many modern computing devices are capable of connecting to various data networks, including the Internet and corporate intranets, to transmit and receive data communications over the various data networks. To facilitate data communication between computing devices, data networks typically include one or more computing nodes (e.g., network switches, network routers, servers, other compute and/or store computing devices, etc.) to route communications (i.e., network packets) from a source computing device to a target computing device. Certain network infrastructures, such as datacenters, may include tens of thousands or more of such computing nodes, making transmission and reception of the network packets in sequential order difficult at best. These multi-node systems may provide processing capacity many orders of magnitude greater than that of a single computer. Some multi-node systems have processing capacity (generally rated by floating point operations per second (FLOP)), in the petaflops range.

The pursuit of increased performance has led to approaches including massively parallel systems featuring a large number of computing nodes, with each node providing one or more processors, memory, and an interface circuit connecting the node to a multi-node network. In so-called "fabric" network configurations, wherein each target node has potentially N number of paths to other nodes of the multi-node network, multiple packets may ultimately be sent between two nodes by multiple paths through the fabric, potentially violating the target node's concurrency limits (signifying resource exhaustion at the target node where the target node can no longer receive additional packets independently). Such concurrency limits may be imposed by protocol constraints that aim to ensure a reliable end-to-end protocol for packet communication within the network fabric. Where concurrency limits of a target node are violated, the packets sent by the source node are not received, and must be retransmitted, negatively impacting system performance. The above problem is exacerbated as the number of nodes within a fabric network increases.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

While embodiments described herein are susceptible to various modifications and alternative forms, specific embodiments have been shown by way of example in the drawings and will be described herein in detail. It should be understood, however, that there is no intent to limit the concepts of the present disclosure to the particular forms disclosed, but to the contrary, the intention is to cover all modifications, equivalents, and alternatives consistent with the present disclosure and the appended claims.

References in the specification to "one embodiment," "an embodiment," "some demonstrative embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As network fabrics within datacenters evolve, they require an ever-increasing number of computing devices (nodes and switches for example) to process and route packets, such as those including data payloads. Where a target node within a given computing system such as a datacenter may typically be provisioned (i.e. may have enough storage and processing capacity) to track over ten thousand packets sent to it and (and either not yet acknowledged (ACK'd) or negative acknowledged (NACK'd), i.e. packets in flight), in a network fabric with tens of thousands or more computing nodes, the target node would likely be unable to store and track the associated number (on the scale of millions) of packets that could be in flight in such a system. Packet generation typically initiates with a command queue that instructs the generation of a message within a core or cores in a given source node, and then instructs the transmission of the message internally to a node fabric controller/network interface card (NIC). The NIC would then generate a packet from that message, and transmit the packet from the node to a target via fabric interconnects. With tens of thousands of source nodes generating multiple pipelines of packets in this way, a mechanism is needed that would allow preserving the pipelines of packets thus being generated while observing protocol constraints on a target's concurrency limits.

Some demonstrative embodiments provide an out-of-range pipelining mechanism according to which a source node generates a packet to a target node, determines whether the packet would be an "out-of-range" packet, that is, a packet outside a maximum range of the number of packets trackable by the target node (what we will refer to as the target's "concurrency limit"), and, if the packet is an out-of-range packet, stores the out-of-range packet within a retransmit buffer (i.e. one allocated to already transmitted packets still needing an indication from the target that they were received), flags the out-of-range packet with an out-of-range or other special flag, and sends the packet to the target node when the packet is within the target's concurrency limit. This retransmit buffer may exist so that the source can retransmit in-flight packets that are corrupted or lost in the fabric.

The above mechanism, by taking advantage of the existing retransmit buffer for in flight packets that may need to be retransmitted, advantageously allows doing away with the idea of a dedicated structure/area on the source node to detect and buffer out-of-range packets, thus avoiding complicating the system structure while nevertheless providing additional needed functionality with respect to packet pipeline improvement. The retransmit buffer, if implemented as an ordered list, may advantageously then track a relative age of each packet to facilitate progress of the oldest outstanding packet first. In a large multi-node system with many nodes, although one packet to a given target node may be an out-of-range packet, all other packets to other target nodes may be within the respective concurrency limits of those targets. In such cases, a source node may typically block packets from issue at sequence number allocation time, in this way blocking all virtual channels (e.g. one channel for each target node) from feeding messages into a packet generation module of the source node. However, any solution to stall an entire pipeline of packets generated within a source node to multiple target nodes could stall the bulk of packets to be sent to all targets by the source node, introducing unnecessary delays in inter-node communications and negatively impacting system performance. According to some demonstrative embodiments, a source node may advantageously continue to generate packets, assign sequence numbers to those packets on a per target basis, and, if one or more of those packets are found to be out-of-range packets, buffer them in an already existing storage space, the retransmit buffer, while allowing other packets to other target nodes to flow unimpeded. In addition, according to some demonstrative embodiments, a source node is able to predict a possible NACK (i.e. a negative acknowledgement packet sent to reject a previously received packet because it may be out-of-range, or because of another error) by a target node, in this way advantageously avoiding sending an out-of-range packet that would cause the NACK, while preserving the out-of-range packet to send the same when its sequence number is compliant with the concurrency limit of the target node. Avoiding a NACK while at the same time preserving the packet generation pipeline help to improve system performance by obviating the cost of both sending an unwanted packet and of receiving and processing the NACK.

The "concurrency limit" of a target as used herein and as referred to above will be explained in further detail below. In general, the concurrency limit refers to a target's tracking resources, that is, to a target's capacity to store and track information regarding packets sent to it by source nodes (packets in flight). As noted above, concurrency limit is used to refer in general to a maximum range of the number of packets trackable by the target node. A target's concurrency limit may be measured in multiple ways.

One example of a target's concurrency limit may be expressed in terms of a "maximum sequence distance limit" or MSDL of the target, which refers to a maximum number of packets in flight trackable by the target within a contiguous block of sequenced packets in flight. Another way to refer to this limit may be "contiguous concurrency." An example of the application of an MSDL scheme may be provided below.

A window-based tracking scheme may be implemented by a source node and a target node during end-to-end communication such that a stream of packets that is contiguous in an overall packet sequence number (PSN) space is routed to, and applied by, a target node. The overall PSN space refers to the overall sequence of numbers assigned to the packets, while the PSN of a packet refers to the packet sequence number assigned to a packet. The target node may track individual packet arrival within a predefined window of contiguous PSNs relative to the overall PSN space. This window may be adaptive and thus change over time in order to maximize use of the target's tracking resources based on various conditions in the network. Thus, the target node may track a subset (window) of contiguous PSNs corresponding to packets that are arriving/expected to arrive. Individual packet arrival is tracked in this way as a combination of a most-recently received packet in a stream of packets that is contiguous in the PSN space, and a finite number of packets received in the window. The target node may then periodically acknowledge packets received in the PSN space within a window (either on a per packet basis, or based on groups of packets within the window, for example, based on groupings of M, with M equal to a whole number by which the window size is divisible), and also may inform the source node of a new MSDL (if there is an updated one) in terms of a maximum distance allowed between the earliest packet in the PSN space not yet acknowledged by the target, and a next packet to be received based on its PSN. Through the ACKs, the target may, according to some demonstrative embodiments, piggy back information to the source node regarding any transmitted packets not yet received. At the same time, the target node may then "shift" the window relative to the received packet furthest along in the PSN space (with everything before that packet also having been received at the target and "retired," for example as indicated by the target to the source by way of ACKs) in order to track additional expected packets from the target node. On the other hand, and in accordance with some demonstrative embodiments, the source node would ensure not to transmit a packet with a PSN that would exceed the MDSL. As the source node is informed of a packet furthest along in the PSN space received (with everything before that packet also having been received by the target node) by the target node, for example as indicated through ACKs by the target node, the source node may then shift its window relative to that packet to transmit the additional expected packets to the target node. Thus, the source node may track packet transmission states based on cumulative updates from the target node.

The above tracking on the source node side allows the source node, according to some demonstrative embodiments, to continue generating packets across multiple virtual channels or multiple targets even though one or more of the packets may be out-of-range with respect to an MSDL of a target node. In such a case, the source node would be able to, according to some demonstrative embodiments, buffer any out-of-range packets in the existing retransmit buffer for transmitted packets that have been NACK'd or that are awaiting ACKs (as for example possibly indicated by the target), and flag those out-of-range packets for transmission to the target node.

The MSDL may be measured by a comparison of the PSN of an oldest packet within a window not yet received by the target node (for example as indicated by the target as not yet received, or as not having received an ACK by the source node within a set period of time), with the PSN of a packet about to be received at the target (that is therefore not in the contiguous block of sequenced packets because it is not in flight, but it is to be sent to the target by the source node). For example, let us suppose that a target's MSDL is represented by 30 packets, meaning that the target has resources to keep track of only 30 packets in flight in a contiguous sequence of packets in flight, and let us also suppose that a contiguous block of 30 bits (bits 0 through 29), with each bit representing a PSN, is allocated by the source node to a sequence of 30 contiguous packets respectively, the 30 contiguous packets being in flight to the same target. Let us further suppose that packets allocated to bits (or PSNs) 1 and 7 have not yet been received by the target, but that the other packets in the sequence of 30 each did receive an ACK. In this case, packets with PSNs 1 and 7 are considered "out of order" packets by the source. A comparison between the PSN of an oldest out of order packet, that is, the PSN 1, and the PSN of the packet about to be sent, that is, the PSN 30, would mean that, if the packet with PSN 30 is sent, the MDSL of 30 would be reached (a difference between 30 and 1 would be 29 packets, plus packet 1 that has not yet been acknowledged, amounting to 30 packets ). Since the number 30 is not more than the MSDL of the target, the target would be able to track the packet allocated with PSN 30. However, if the packet with PSN 0 were the out of order packet, then, the comparison between the number 30 and the number 0 would lead to 31 packets in flight, meaning that the packet with PSN 30 would likely be rejected by the target. The above scenario may come into play for example where memory operations within a target node may be delayed until all packets within a given window in the overall PSN space have been received and retired, including those with earlier PSNs that are yet to be received by the target. As indicated previously, the source node would have information regarding packets not yet received for example through an indication by the target of the same, or through non-receipt of an ACK within a set time period, or otherwise.

Another example of a target's concurrency limit may be expressed in terms of the maximum number of missing packets (MNMP) that the target is capable of tracking. For example, let us suppose that a target's MNMP is represented by 30 packets, meaning that the target has resources to keep track of only 30 packets in flight, and let us also suppose that a contiguous block of 30 bits (bits 0 through 29), with each bit representing a PSN, is allocated by the source node to a sequence of 30 contiguous packets respectively, the 30 contiguous packets being in flight to the same target. Let us further suppose that packets allocated to bits (or PSNs) 1 and 7 have not yet been received by the target (for example as indicated by the target node to the source node, or as assumed by source node through non-receipt of ACK without a time out period), but that the other packets in the sequence of 30 each have been received. In this case, it is assumed that the target is keeping track of the two missing packets with PSNs 1 and 7, and has room to receive 30 minus 2, that is, 28 additional packets. However, if we were to send 29 additional packets, there is a possibility that all 29 of the packets sent may not have been received, in which case we would have 29 plus 2 that is 31 missing packets in flight. In such a case, one of those missing packets may be rejected by the target. The above scenario may come into play for example where memory operations within a target node may be not need to be delayed until all packets within a given window in the overall PSN space have been received and retired, including those with earlier PSNs that are awaiting receipt.

Whether a MSDL or a MNMP regime is used to determine concurrency limit at the target node, the target could inform the source node of which of the regimes are to be used in a dynamic fashion, or, these regimes may be statically predefined within a memory of the source node.

While specific references may be made to HPC applications, this disclosure is not intended to be limited in this regard. For example, nodes may comprise standard computer systems, such as server computers commercially available for non-HPC applications (e.g., data storage, email servers, domain controllers, etc.). Thus, the multi-node network may not necessarily comprise a so-called "super computer" configured with ultra-high performance computing nodes. In addition, both general-purpose datacenter applications and specific-purpose datacenter applications are within the scope of this disclosure. For example, general-purpose datacenters generally include infrastructure that supports a single business with a broad variety of applications, or an information technology (IT) service provider servicing many customers. On the other hand, specific-purpose datacenters generally include university and military research, scientific laboratories, financial institutions, and search engine providers, just to name a few. Specific-purpose datacenters generally implement specific usage patterns and are well suited for highly-scalable architecture that is tailored for a single or otherwise limited number of purposes. In any such cases, the protocol for providing out-of-order, end-to-end reliability disclosed herein is equally applicable to both general-purpose and specific-purpose datacenter applications.

Figure 1:
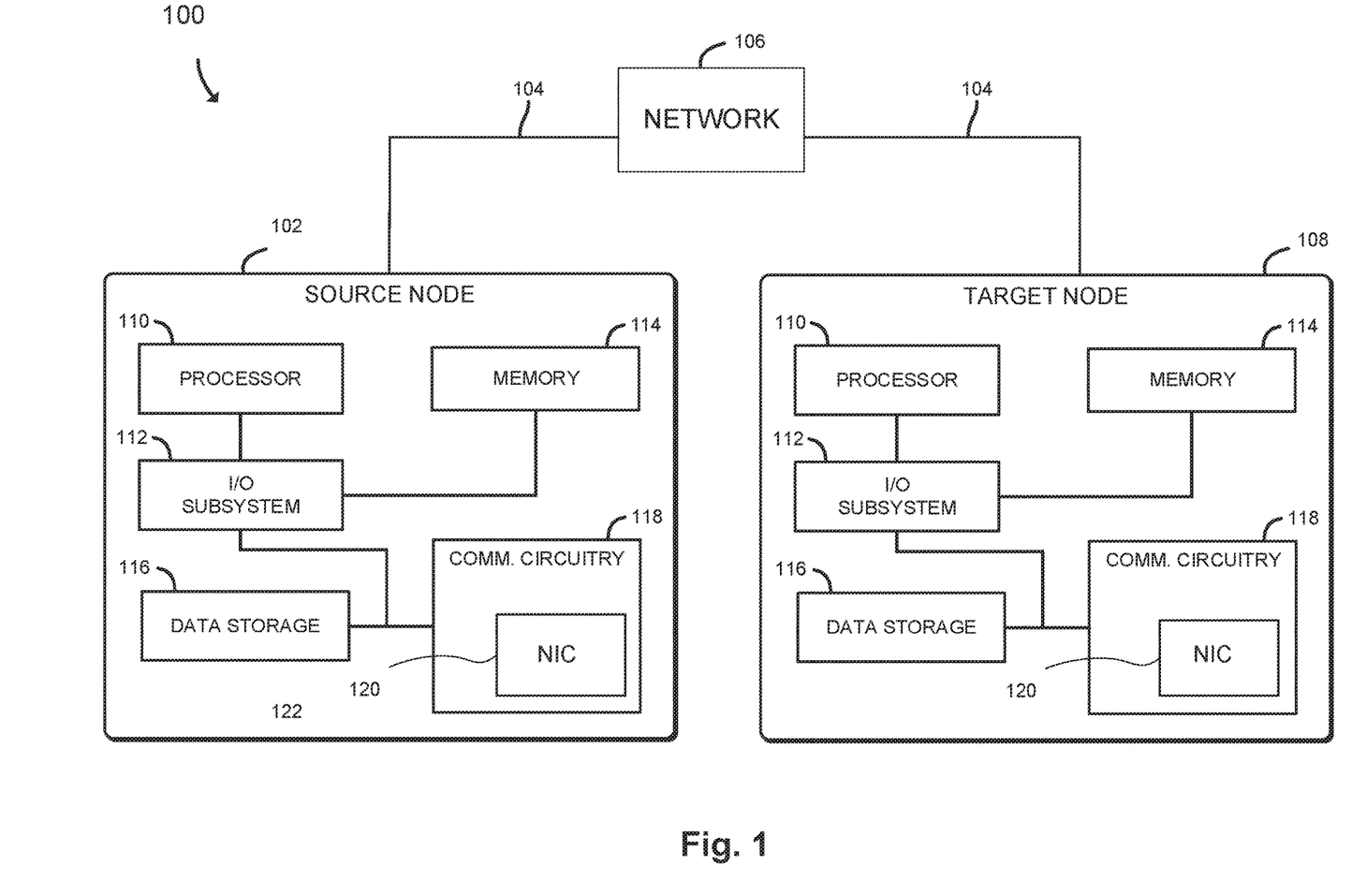
FIG. 1 is a simplified block diagram of at least one embodiment of a system for tracking out-of-order network packets that includes a source node and a target node communicatively coupled over a communication channel via a network.

Reference is now made to FIG. 1, which, in an illustrative embodiment, shows two computing devices in the form of a source node 102 and a target node 108 communicatively coupled to one another by way of network fabric interconnects 104 through network 106 of network fabric 100. The source node 102 is configured to transmit information (e.g., a data object, an acknowledgment, etc.) to the target node 108 via one or more network packets generated by the source node 102.

In some embodiments, the network packet(s) may include a header and some information, typically formatted as an inline message or appended payload. The header includes identifying information of the network packet, while the payload includes at least a portion of a data object (e.g., as a result of packetizing the data object). It should be appreciated that the source computing device 102 may transmit each of the network packets in sequential order such that the target node 108 can reconstruct/re-order the data object from any received out-of-order network packets.

While only a single source node 102 and a single target node 108 are shown in the illustrative network fabric 100, it should be appreciated that, in some alternative embodiments, the network fabric 100 may include one or more source nodes 102 communicatively coupled with one or more target nodes 108. One such example alternative embodiment includes many (e.g., tens of thousands) of source nodes 102 communicating with a few (e.g., tens or hundreds) target nodes 108, resulting in a large number of interconnects 104 at each of the target nodes 108 communicating at a low packet rate. Another such example alternative embodiment includes a few (e.g., tens or hundreds) source nodes 102 communicating with many (e.g., tens of thousands) target nodes 108, resulting in a small number of interconnects 104 at each of the target nodes 108 communicating at a high packet rate.

The source node 102 and target node 108 may be embodied as any type of computation or computing device capable of performing the functions described herein, including, without limitation, a server (e.g., stand-alone, rack-mounted, blade, etc.), a network appliance (e.g., physical or virtual), a switch, a router, a web appliance, a distributed computing system, a processor-based system, a multiprocessor system, and/or any other computing/communication device. The illustrative source node 102 or target node 108 may each include a processor 110, an input/output (I/O) subsystem 112, a memory 114, a data storage device 116, and communication circuitry 118. Of course, the source node 102 or target node 108 may include other or additional components, such as those commonly found in a network computing device (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 110 in some embodiments. Further, in some embodiments, one or more of the illustrative components may be omitted from the source node 102 or the target node 108.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the source node 102 or target node 108, such as operating systems, applications, programs, libraries, and drivers.

The memory 114 may be communicatively coupled to the processor 110 via the I/O subsystem 112, which may be embodied as circuitry and/or components to facilitate input/output operations with the processor 110, the memory 114, and other components of the source node 102 or the target node 108. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the source node 102 or target node 108, on a single integrated circuit chip.

The data storage device 116 may be embodied as any type of device or devices configured for short-term or long-term storage of data such as, for example, memory devices and circuits, memory cards, hard disk drives, solid-state drives, or other data storage devices. The data storage device 116 and/or the memory 114 may store various data as described herein, including operating systems, applications, programs, libraries, drivers, instructions, etc., capable of being executed by a processor (e.g., the processor 110) of the source node 102 or target node 108.

The communication circuitry 118 may be embodied as any communication circuit, device, or collection thereof, capable of establishing a communication channel with other nodes through interconnects, such as interconnects 104 to other nodes, and enabling communications across the network fabric 100. The communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. In some embodiments, the communication circuitry 118 is further configured to perform high-speed communication (e.g., in a high-performance compute (HPC) environment) with other like computing devices.

The illustrative communication circuitry 118 includes a network interface controller (NIC) 120, also sometimes referred to as a host fabric interface (HFI) in fabric interconnects. The NIC 120 may be embodied as one or more add-in-boards, daughtercards, network interface cards, controller chips, chipsets, or other devices that may be used by the source node 102 or target node 108. For example, in some embodiments, the NIC 120 may be integrated with the processor 110, embodied as an expansion card coupled to the I/O subsystem 112 over an expansion bus (e.g., PCI Express), part of an SoC that includes one or more processors, or included on a multichip package that also contains one or more processors. It should be appreciated that, in some embodiments, the NIC 120 may be capable of performing the offloaded functions as described herein. Additionally, or alternatively, in such embodiments, the NIC 120 may include a local processor (not shown) and/or local memory (not shown) capable of processing and storing data locally, respectively, such that a state of the source node 102 or target node 108 is not affected (i.e., no software latency introduced). In some demonstrative embodiments, as shown in FIG. 1, the NIC 120 may include any combination of programmable engines, programmable hardware, or fixed hardware, as would be recognized by one skilled in the art. For example, the NIC 120 may include an FPGA, although embodiments are not so limited. An FPGA may be a semiconductor device that may include configurable/reprogrammable logic circuitry. An FPGA may be programmed via a data structure (e.g., a bit-stream) having any suitable format that defines how the logic is to be configured. An FPGA may be reprogrammed any number of times after the FPGA is manufactured. The configurable logic of an FPGA may be programmed to implement one or more kernels.

The network 106 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 106 may include any number of may include additional computing devices (i.e., networking devices) (not shown), physical and/or virtual, that may be commonly found in networks, such as servers, switches, routers, access points, network controllers, etc. It should be appreciated that, in some embodiments, the network 106 may be embodied as any type of parallel and/or distributed computing architecture (e.g., a high-performance computing (HPC) network architecture) that is capable of high-speed, low-latency interconnectivity, such as a cluster computing network architecture and/or a grid computing network architecture (e.g., a fabric computing network architecture).

Figure 2:
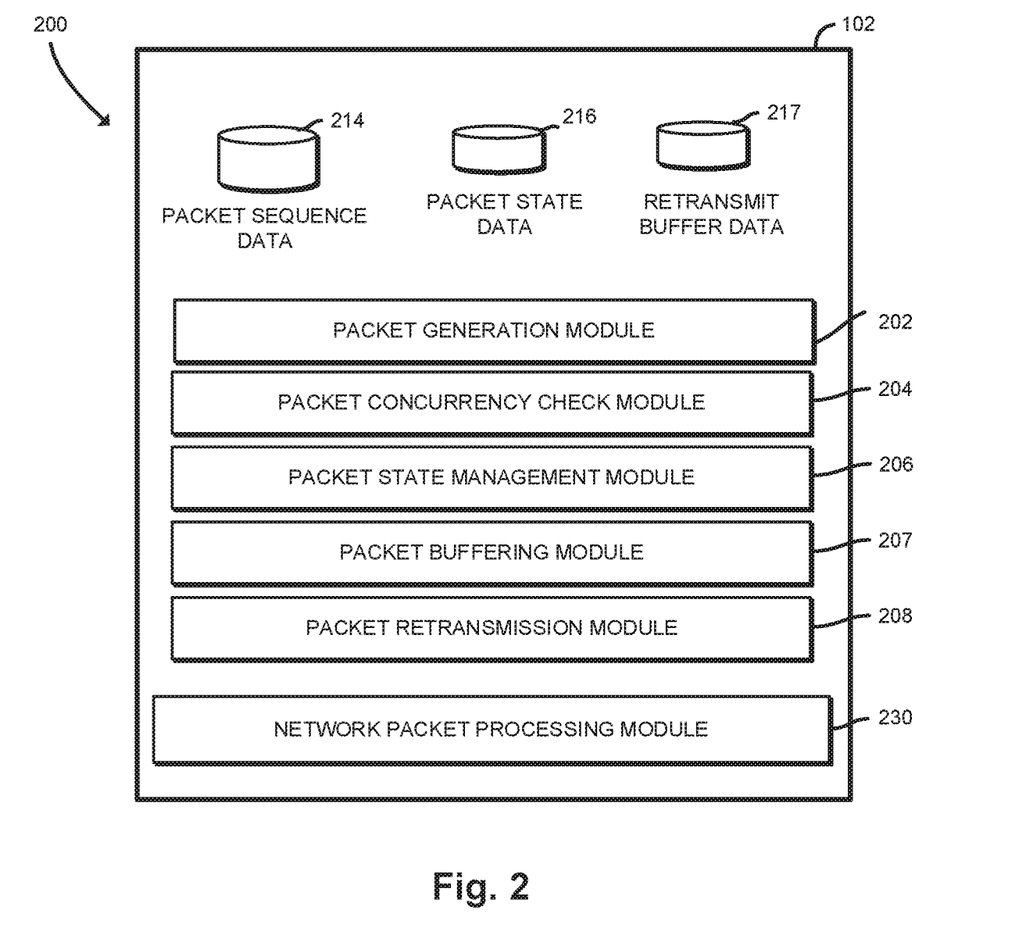
FIG. 2 is a simplified block diagram of at least one embodiment of an environment that may be established by the source node of the system of FIG. 1.

Referring now to FIG. 2, in an illustrative embodiment, the source node 102 establishes an environment 200 during operation. The illustrative environment 200 includes a packet generation module 202, a packet concurrency check module 204, a packet state management module 206, a packet buffering module 207, and a packet retransmit module 208, and a packet processing module 230. Each of the modules, logic, and other components of the environment 200 may be embodied as hardware, software, firmware, or a combination thereof. For example, each of the modules, logic, and other components of the environment 200 may form a portion of, or otherwise be established by, the processor 110 or other hardware components of the source node 102. As such, in some embodiments, one or more of the modules of the environment 200 may be embodied as circuitry, such as processing circuitry, or a collection of electrical devices (e.g., packet generation circuitry 202, packet concurrency check circuitry 204, packet state management circuitry 206, packet buffering circuitry 207, packet retransmit circuitry 208, and packet processing circuitry 210, etc.). According to some demonstrative embodiments, the packet generation module 202, the packet concurrency check module 204, the packet state management module 206, the packet buffering module 207 and the retransmit module 208 may be incorporated in whole or in part within the NIC 120 of the source node 102.

In the illustrative environment 200, the source node 102 additionally includes packet sequence data 214, packet state data 216, and retransmit buffer 217 each of which may be stored in the memory 114 and/or the data storage 116 of the source node 102, and may be accessed by the various modules and/or sub-modules of the source node 102. It should be appreciated that the source node 102 may include other components, sub-components, modules, sub-modules, circuitry, and/or devices commonly found in a computing node of a network, which are not illustrated in FIG. 2 for clarity of the description.

The packet generation module 202 is configured to generate network packets for transmission by the source node 102. For example, a series of virtual channel queues representing messages generated by one or more cores within the source nodes, such as cores within processor 110, may be sent to the packet generation module, which in turn would generate a stream of packets using those messages, the packets being addressed to one or more target nodes in communication with the source node 102 through network interconnects 104 within network fabric 100. The packet generation module 202 is also configured to assign a PSN to each packet being generated within the stream of packets, the packet PSNs being contiguous in an overall PSN space. The PSNs may be tracked within the package sequence data 214. The packet generation module may include the PSN within a header portion of each packet, for example by way of a number of bytes (e.g., a 2, 4, or 8-byte value). In an embodiment, the packet may include an identifier of at least one memory operation (e.g., a get or set) and an optional data payload. In an embodiment, the assigned PSN may be a discrete/unique number assigned by the packet generation module from a range of PSNs starting at a starting PSN, for example a starting PSN provided by the target node, and consecutively incremented by at least one therefrom. For example, according to some demonstrative embodiments, if the current packet's PSN is equal to 9, and the MSDL is equal to 30, and all packets with PSNs less than 9 have been acknowledged by the target node, the source node may, for example, continue to have its packet generation module generate and send packets to the designated target node up to packet with PSN equal to 38 (as there could then be 30 packets in flight, equal to the MSDL of 30). For any packets with a PSN above 38, the source node, according to some demonstrative embodiments, may continue to have its packet generation module generate and assign PSNs to those packets, and buffer and flag those packets as out-of-range packets for later transmission to the target node, as will be described in further detail below. In some embodiments, at least a portion of the functionality of the packet generation module 202 may be performed by the NIC 120 of FIG. 1.

The packet concurrency check module 204 is configured to determine, based on the PSNs of the packets generated by the packet generation module 202, whether each packet would violate the target node's concurrency limit, such as, for example, either its MSDL or its MNMP. For example, if the packet concurrency check module is using a MSDL scheme for the target, the packet concurrency check module 204 may first compare the PSN of an oldest packet for which an ACK was not received by the source node with the PSN of the next packet in the queue to be sent to the target node. For example, if the PSN of an oldest packet not received is 8, and the PSN of the next packet in the queue is 37, the packet concurrency check module would determine that, by sending packet with PSN 37, there would be 31 packets in flight (packet with PSN 8, packet with PSN 37, and all packets in between). If the MSDL of the target node, available to the source node for example by way of memory 114 or data storage 116, is set to 30, then the source node would know that sending packet with PSN of 31 would violate the target node's concurrency limit by way of violating its MSDL. In the alternative, if a MNMP scheme is used by the source node (and the target node), the packet concurrency check module 204 may count the number of packets not yet received by the target node. For example, if packets with PSNs of 7, 9 and 15 to the target node have not yet been received by the target (that is, if there are 3 packets not yet received by the target), and if the MNMP at the target node, known to the source node for example by being stored in memory 114 or in data storage 116, is 10, then the source node would know that is could send another 7 packets to the target node without violating the MNMP allowed by the target node. Thus, if the next PSN in the sequence of packets to be sent is 22 for example, the source node may send packets with PSNs 22 through 28 to the target node without violating the MNMP of the target node. In some embodiments, at least a portion of the functionality of the packet concurrency check module may be performed by the NIC 120 of FIG. 1.

The packet state management module 206 of FIG. 2 may be configured to flag and keep track of a state of transmitted packets. For example, where a stream of packets with given PSNs is transmitted to a target node, the packet state management module 206 may flag those packets as "transmitted" and store information regarding the "transmitted" flag associated with the given PSNs within the packet state data 212 until, for each packet, either an ACK, a NACK is received, or until there is otherwise an indication from the target node that the packet has not been received. If the packet was received, for example through the receipt of an ACK sent by the target node, the packet state management module 206 may remove information regarding the PSN and state of that packet from the packet state data (as there could no longer be a need to track that packet). However, if a NACK is received for a packet, or if there is otherwise an indication that the packet was not received, the packet state management module may flag the packet as one "to be retransmitted" and change the designation of the PSN of that packet in the packet state data 212 as "to be retransmitted." Similarly, according to some demonstrative embodiments, where a packet to be transmitted to a target node is determined as violating the target node's concurrency limit (i.e. determined as being an "out-of-range" packet), for example using the packet concurrency check module 204 described above, the packet state management module 206 may flag the out-of-range packet as "out-of-range" and store information regarding the "out-of-range" flag associated with the packet, such as with its PSN, in the packet state data 216, together with state information regarding the packets flagged with "to be retransmitted." In some embodiments, at least a portion of the functionality of the packet state management module 206 may be performed by the NIC 120 of FIG. 1.

The packet buffering module 207 may be configured to buffer those packets that are flagged with either "retransmit" or with "out-of-range" in a retransmit buffer 203 of the source node 102, for example in a retransmit buffer in either the memory 114 or data storage 116 of the source node 102. For example, where packets having PSNs 2, 5, and 15 may have been flagged by the packet state management module 206 because of having received a NACK from the target node (such as through one or more errors occurring within the network fabric), and where packets having PSNs 22, 23, and 24 may have been flagged as "out-of-range" by the packet state management module because of having been determined by the packet concurrency check module 204 as being "out-of-range," the packet buffering module 207 would, according to some demonstrative embodiments, buffer all of packets with PSNs 2, 5, 15, 22, 23, and 24 for retransmission. In some embodiments, at least a portion of the functionality of the packet buffering module 207 may be performed by the NIC 120 of FIG. 1.

The retransmit module 208 is configured to access packets within the retransmit buffer 217 and to transmit them to the target node. For example, where packets with PSNs 2, 5, 15, 22, 23 and 24 are in the retransmit buffer and queued for retransmission, the retransmit module may transmit those packets to the target node based in part on the target node's concurrency limit. The retransmit module 208 may therefore receive input from the packet concurrency check module 204, and may retransmit the packets within the retransmit buffer 203. An order for retransmission of the packets within the retransmit buffer 203 may be implementation specific. For example, the retransmit module may be configured to retransmit the packets within the retransmit buffer in order by virtue of their PSNs, or it may retransmit those packets according to other priorities, such as, for example, according to their respective Quality of Service (QoS) priorities (QoS priorities), or both. Thus, a packet in the retransmit buffer 203 may, according to one embodiment, be retransmitted before another packet in the retransmit buffer 203 if its QoS is at a higher priority than that of the other packet. In some embodiments, at least a portion of the functionality of the retransmit module 208 may be performed by the NIC 120 of FIG. 1.

The network packet processing module 230 is configured to process packets received by the source node, or to transmit packets to various target nodes. For example, in some embodiments, the network packet processing module 230 may be configured to perform a routing/forwarding lookup to determine a destination for the packet, perform one or more service functions on the packet (e.g., firewall, network address translation (NAT), load-balancing, deep packet inspection (DPI), transmission control protocol (TCP) optimization services, etc. In some embodiments, the network packet processing module 210 may be configured to receive ACKs and NACKs from the target node, and to provide relevant parts of such information to the packet state management module 206 such that a state of packets receiving the ACKs or NACKs, or a state of packets whose status at the target may have been piggy-backed onto ACKs or NACKs for other packets, may be updated in the packet state data 216. In some embodiments, at least a portion of the functionality of the network packet processing module 210 may be performed by the NIC 120 of FIG. 1.

Figure 3:
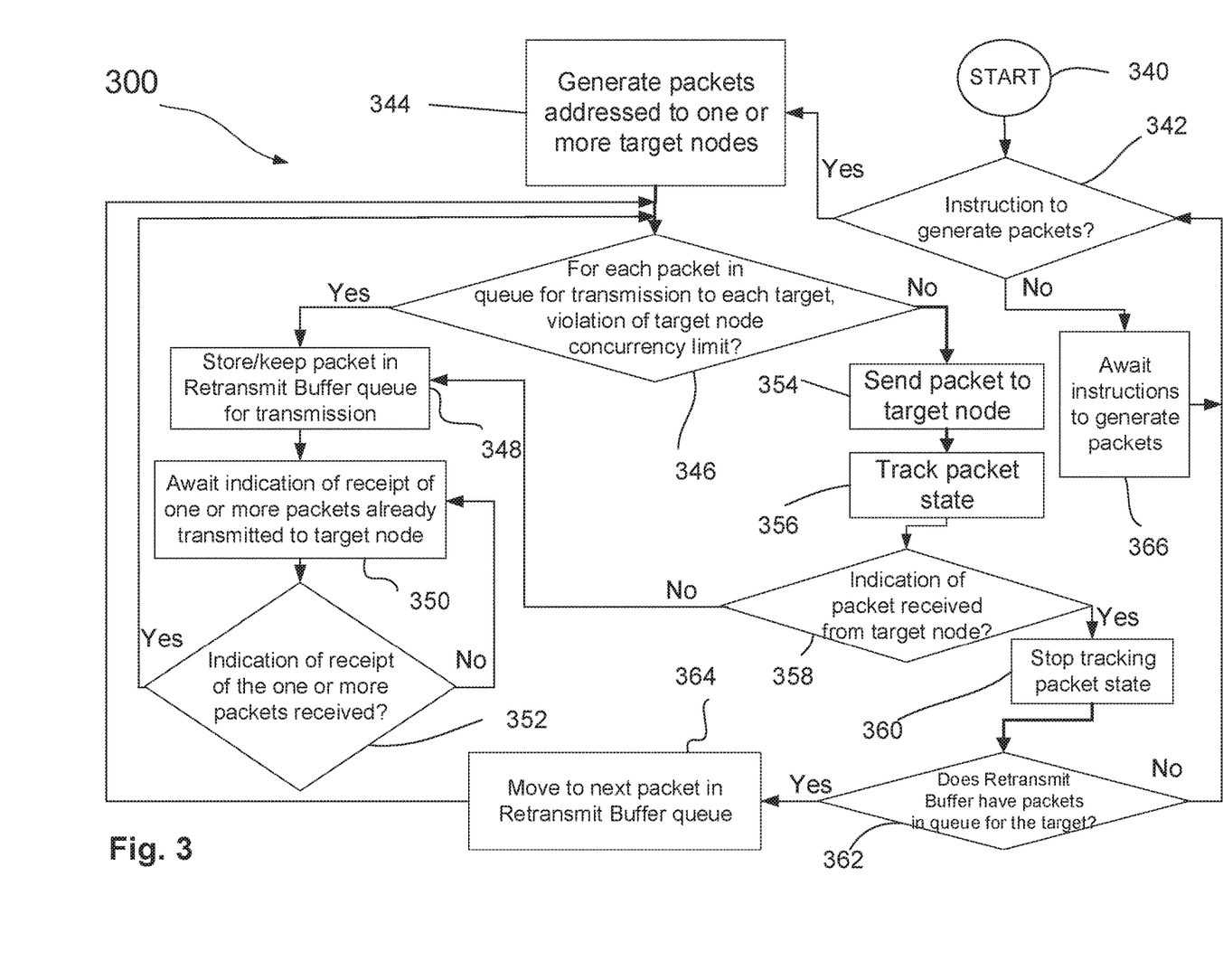
FIG. 3 is an illustration of a method according to some demonstrative embodiments.

Referring now to FIG. 3, in use, the source node 102 may execute a method 300 to buffer and transmit out-of-range packets according to some demonstrative embodiments. It should be appreciated that, in some embodiments, the method 300 may be embodied as various instructions stored on a computer-readable media, which may be executed by the processor 110, the NIC 120, and/or other components of the source node 102 to cause source node 102 to perform the method 300. The computer-readable media may be embodied as any type of media capable of being read by the source node 102 including, but not limited to, the memory 114, the data storage device 116, a local memory of the network interface controller 120, other memory or data storage devices of the source node 102, portable media readable by a peripheral device of the source node 102, and/or other media. In the description of method 300 below, reference will be made to the source node 102 described above in relation to FIG. 1, and further to various components/modules described above with respect to FIG. 2 above. It is to be noted that method 300 shown in FIG. 3 and described below is merely one embodiment of many, and that many modifications may be made to method 300 as would be recognized by a skilled person without departing from the scope of embodiments as expressed in the instant disclosure and in the claims to follow.

The method 300 shown in FIG. 3 begins with block 340, at which point the source node 102 determines whether instructions exist, for example from any of the cores in the source node, to generate packets. If no, the method branches to block 366, at which time the source node awaits instructions to generate packets. If yes, the packet generation module 202 may then generate packets addressed to one or more target nodes within the network fabric 100, and may assign a PSN to the packet, which PSN may be tracked within the packet sequence data 214. Thereafter, at block 346, for each packet that has been generated by the packet generation module 202 to its target node, and therefore in queue for transmission to the target node in question, the packet concurrency check module 204 determines whether sending that packet would violate the target node's concurrency limit. Such a determination by the packet concurrency check module 204 may be performed in multiple ways, for example, by using either of the MSDL scheme or the MNMP scheme described above. If there would be no violation, the method 300 branches to block 354.

At block 354, the source node would send the packet for example using the packet processing module 210, and move onto block 356. At block 356, the source node would track a state of the packet as "transmitted", for example within the packet state data 216. Thereafter, method 300 would move to block 358 at which point the source node would await receipt of an indication of receipt of the packet from the target node (such as through an ACK).

If, form the inquiry in block 358, an indication of receipt, such as an ACK, is received for that packet, the packet state management module 206 would stop at block 360 tracking the packet state (and the packet would be removed from the queue of packets). Thereafter, at block 362, the source node would determine whether its Retransmit Buffer 217 has any packets in queue for transmission to the target node. According to the shown embodiment, the packets in the Retransmit Buffer 217 would get priority within the transmission queue because they are older, although embodiments are not so limited. If there are no packets for transmission in the Retransmission Queue to the target node, the method would move to block 365 to determine whether there are, in general, packets in queue for transmission to the target node. If yes, the method would move to the next packet in the queue (would move the next packet "in-window") for transmission (block not shown) and would then revert back to block 346 to perform a concurrency check on that packet. If, however, there are packets in the Retransmission Buffer for transmission, the method would move to block 364, at which point it would move the next packet "in-window" for transmission to the target node. Thereafter, the method would revert back to block 346 to perform a concurrency check. The above flow could be modified in many ways. For example, checking to see if there are any packets in queue within the Retransmit Buffer 217 or in general could take place each time a transmitted packet received (e.g. ACK'd) by the target node, or each time predetermined groups of packets are received (e.g. ACK'd) by the target node. Therefore, packets could be moved "in-window" either individually or in groups.

If, from the inquiry in block 358, a packet is not received at the target node, for example either by virtue of a NACK being received at the source node, or by virtue of non-receipt information for that packet being piggy-backed onto other information sent to the source node by the target, or by virtue of a lack of ACK for that packet at the source node within a time-out period, the method would branch to block 348, at which point the transmitted packet to be retransmitted would be stored in the source node's Retransmit Buffer 217 and placed in queue for transmission to the target node. Blocks subsequent to block 348 will be described in further detail below.

According to some demonstrative embodiments, if it is determined at block 346 by the packet concurrency check module that the packet being considered violates the target node's concurrency limit (is an "out-of-range" packet), the method 300 would branch to block 348. At block 348, the packet that would have otherwise violated the target node's concurrency limit is stored in the source node's Retransmit Buffer 217, for example along with transmitted packets that are awaiting retransmission to the target node. At block 348, the out-of-range packet could be flagged with "out-of-range," or "retransmit" or other special flag by the packet state management module 206, and its state stored as such in the packet state data 216. Subsequently, from block 348, the method would move to block 350 where the source node would await information regarding receipt by the target node of one or more packets already transmitted to the target node, for example through the receipt of ACKs for those packets.

The method would then move to block 352 to make a determination regarding receipt by the target node of packets transmitted to the target node. If one or more packets are determined as being received by the target, this would mean that the target has retired those packets, and that the packets in queue within the Retransmit Buffer 217 can now move "in-window" for retransmission. For any packet moved to an "in-window" state, the packet state management module could keep track of such state. The method would then revert to block 346 for next "in-window" packet for transmission. The order in which packets in the Retransmit Buffer 217 are transmitted by the source node may be implementation specific. For example, as noted above the retransmit module 208 may be configured to retransmit the packets within the retransmit buffer in order by virtue of their PSNs, or it may retransmit those packets according to other priorities, such as, for example, according to their respective Quality of Service (QoS) priorities (QoS priorities), or both. The method would further include the source node continuing to check for an indication of one or more received packets at block 350 until such indication is received.

Figure 4A:
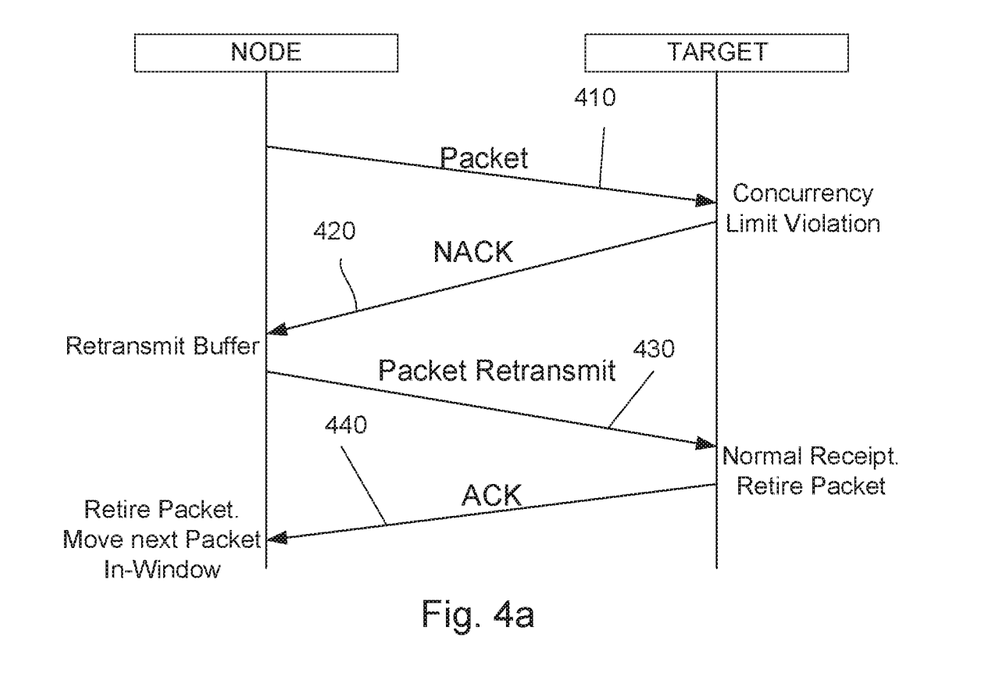
FIG. 4a is an illustration of a fabric flow depicting a sequence of messages between a source node and a target node where a packet is sent in violation of the target node's concurrency limit.
Figure 4B:
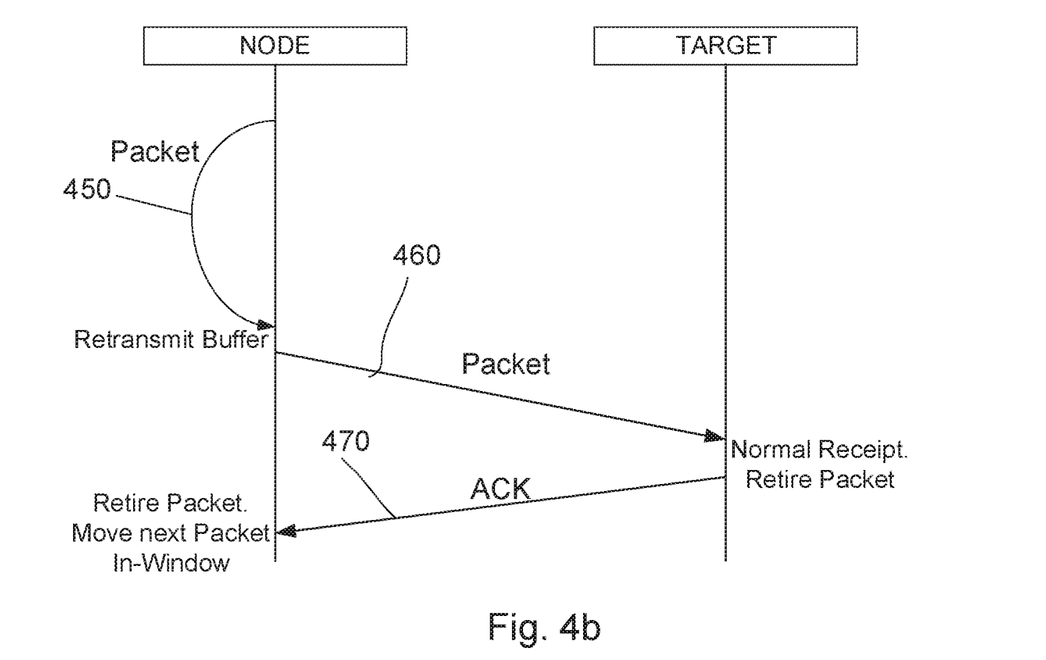
FIG. 4b is an illustration of a fabric flow similar to that of FIG. 3, showing a sequence of messages between a source node and a target node, where the source nodes operates according to some demonstrative embodiments.

The flow in FIG. 4 may be modified as noted previously without departing from the spirit of the disclosure. For example, method 400 shown in FIG. 4 may be interpreted as requiring that, for each target node being considered by the source node, all packets in queue in the Retransmit Buffer 217 would need to be sent to the target node and retired by the same before other packets in queue to that target node are sent to the same. However, embodiments include within their scope the provision of a mechanism where the source node may switch between the queue within the Retransmit Buffer and the regular queue of packets to be sent in order to pick packets for transmission to a target node based on application needs.

It is to be appreciated from FIG. 3 that all blocks within the shown flow of method 300, exclusive of blocks 340, 342, 344 and 366 may happen in parallel for each target node for which packets are being generated by the source node 102. As a result, advantageously, embodiments make possible the unimpeded generation and sending of packets to a number of target nodes even though some of those packets may be identified as being "out-of-range," in this way improving system performance. In addition, embodiments, as depicted for example in the exemplary method of FIG. 3, predict instances where a packet may be out-of-range, and avoid sending that packet to a target node by buffering the out-of-range packet in the source node's existing retransmit buffer, in this way avoiding the cost and delay associated with receiving NACKs from the target node, and at the same time making efficient use of system resources within the source node.

The flows described in FIG. 3 is merely representative of operations or communications that may occur in particular embodiments. In other embodiments, additional operations may be performed or additional communications sent among the components of a network fabric according to embodiments. Various embodiments of the present disclosure contemplate any suitable signaling mechanisms for accomplishing the functions described herein. Some of the communications or other operations illustrated in FIG. 3 may be repeated, combined, modified or deleted where appropriate. Additionally, operations may be performed in any suitable order without departing from the scope of particular embodiments.

Reference is now made to FIGS. 4a and 4b, which respectively show a flow where a concurrency enforcement scheme according to some demonstrative embodiments is not used (FIG. 4a), and one where such a scheme is used according to some demonstrative embodiments (FIG. 4b).

Referring first to FIG. 4a, where concurrency limits are not enforced, a source may send a packet to a target without regard to the target's concurrency limit at 410. However, at 420, the target, having had its resources exhausted and its concurrency limits reached, would send back a NACK to the source. At this time, the source would allocate the packet to its retransmit buffer, and would attempt to retransmit the packet at 430. Thereafter, if concurrency limits are not violated this time, the target would send back an ACK at 440, and would retire the packet. The source, having received the ACK, would retire the packet on its end, and would move the next packet up for transmission "in-window" as described above. The above scenario however incurs costs in the form of inefficiencies in the system performance by virtue of the need for the NACK and for two transmissions before the packet is retired.

Referring first to FIG. 4b, where concurrency limits are enforced according to some demonstrative embodiments, a source may determine whether or not sending a packet would violate the target's concurrency limit, and, if it does, it would, at 450, store the packet in its already existing retransmission buffer. Thereafter, when the source determines that sending the packet would no longer violate the target's concurrency limit, it would, at 460, send the packet to the target. The target would send back an ACK at 470, and would retire the packet. The source, having received the ACK, would retire the packet on its end, and would move the next packet up for transmission "in-window" as described above. The above scenario advantageously does away with the costs incurred in the scenario of FIG. 4a associated with inefficiencies in the system performance by virtue of the need for the NACK and for two transmissions before the packet is retired. The above scenario achieves such advantages by using already available resources within the source node, that is, its already existing retransmit buffer and retransmit logic.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parseable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as network fabric connections, processors, memory devices, cored, FPGAs, memory controllers, intra-node communication controllers, fabric controller, fabric interface controller, or other entity described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

In addition, use of the word "if" in the instant disclosure, including in the claims, may be interpreted to mean "in response to a determination that," and/or "at least partly in response to a determination that," including a causal chain that does not necessarily include a single immediate causation.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; 3D Cross Point (3D XP) memory, other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

EXAMPLES

Illustrative examples of the technologies disclosed herein are provided below. An embodiment of the technologies may include any one or more, and any combination of, the examples described below.

Example 1 incudes a device comprising: a memory device; and a network interface controller coupled to the memory device and including circuitry to communicate with a plurality of target nodes in a network fabric, the circuitry to generate packets for transmission to respective ones of the target nodes. The circuitry is further to, for each packet addressed to its corresponding target node: determine whether transmitting the packet would violate the target node's concurrency limit; if transmitting the packet would not violate the target node's concurrency limit, transmit the packet to the target node; if transmitting the packet would violate the target node's concurrency limit store the packet in a retransmit buffer of the device, and transmit the packet from the retransmit buffer when transmitting the packet from the retransmit buffer would not violate the target node's concurrency limit.

Example 2 includes the subject matter of Example 1, and optionally, wherein the circuitry to generate, for transmission to each of the plurality of target nodes, a stream of contiguously sequenced packets in a packet sequence number (PSN) space.

Example 3 includes the subject matter of Example 2, and optionally, wherein the concurrency limit corresponds to a Maximum Sequence Distance Limit (MSDL) of the target node.

Example 4 includes the subject matter of Example 1, and optionally, wherein the concurrency limit corresponds to a Maximum Number of Missing Packets (MNMP) for the target node.

Example 5 includes the subject matter of Example 1, and optionally, wherein the circuitry is to receive from the target node a first indication regarding received packets, and a second indication regarding packets not received, the circuitry to determine whether transmitting the packet would violate the target node's concurrency limit based on the first and second indications.

Example 6 includes the subject matter of Example 5, and optionally, wherein the circuitry is to receive from the target node a third indication regarding the target node's concurrency limit, the circuitry to determine whether transmitting the packet would violate the target node's concurrency limit based on the first and second indications.

Example 7 includes the subject matter of Example 1, and optionally, wherein the circuitry is to flag the packet as an out-of-range packet as part of storing the packet in the retransmit buffer.

Example 8 includes the subject matter of Example 1, and optionally, wherein the device is to move the packet stored in the retransmit buffer to an in-window state before transmitting the packet.

Example 9 includes a method to transmit packets from a device in a network fabric, the method including: generating packets for transmission to respective ones of a plurality of target nodes; for each packet addressed to its corresponding target node: determining whether transmitting the packet would violate the target node's concurrency limit; if transmitting the packet would not violate the target node's concurrency limit, transmitting the packet to the target node; if transmitting the packet would violate the target node's concurrency limit: storing the packet in a retransmit buffer of the device, the retransmit buffer to further store already transmitted packets flagged for retransmission, and transmitting the packet from the retransmit buffer when transmitting the packet from the retransmit buffer would not violate the target node's concurrency limit.

Example 10 includes the method of Example 9, and optionally, further including generating, for transmission to each of the plurality of target nodes, a stream of contiguously sequenced packets in a packet sequence number (PSN) space.

Example 11 includes the method of Example 10, and optionally, wherein the concurrency limit corresponds to a Maximum Sequence Distance Limit (MSDL) of the target node.

Example 12 includes the method of Example 9, and optionally, wherein the concurrency limit corresponds to a Maximum Number of Missing Packets (MNMP) for the target node.

Example 13 includes the method of Example 9, and optionally, further including: receiving from the target node a first indication regarding received packets, and a second indication regarding packets not received; and determining whether transmitting the packet would violate the target node's concurrency limit based on the first and second indications.

Example 14 includes the method of Example 13, and optionally, further including: receiving from the target node a third indication regarding the target node's concurrency limit; and determining whether transmitting the packet would violate the target node's concurrency limit based on the first and second indications.

Example 15 includes the method of Example 9, and optionally, wherein storing includes flagging the packet as an out-of-range packet.

Example 16 includes the method of Example 9, and optionally, further including moving the packet stored in the retransmit buffer to an in-window state before transmitting the packet.

Example 17 includes a product comprising one or more tangible computer-readable non-transitory storage media comprising computer-executable instructions operable to, when executed by at least one computer processor, enable the at least one computer processor to implement operations at a device, the operations including: generating packets for transmission to respective ones of a plurality of target nodes; for each packet addressed to its corresponding target node: determining whether transmitting the packet would violate the target node's concurrency limit; if transmitting the packet would not violate the target node's concurrency limit, transmitting the packet to the target node; if transmitting the packet would violate the target node's concurrency limit: storing the packet in a retransmit buffer of the device, the retransmit buffer to further store already transmitted packets flagged for retransmission, and transmitting the packet from the retransmit buffer when transmitting the packet from the retransmit buffer would not violate the target node's concurrency limit.

Example 18 includes the subject matter of Example 17, and optionally, wherein the operations further include generating, for transmission to each of the plurality of target nodes, a stream of contiguously sequenced packets in a packet sequence number (PSN) space.

Example 19 includes the subject matter of Example 18, and optionally, wherein the concurrency limit corresponds to a Maximum Sequence Distance Limit (MSDL) of the target node.

Example 20 includes the subject matter of Example 17, and optionally, wherein the concurrency limit corresponds to a Maximum Number of Missing Packets (MNMP) for the target node.

Example 21 includes the subject matter of Example 17, and optionally, wherein the operations further include: receiving from the target node a first indication regarding received packets, and a second indication regarding packets not received; and determining whether transmitting the packet would violate the target node's concurrency limit based on the first and second indications.

Example 22 includes the subject matter of Example 21, and optionally, wherein the operations further include: receiving from the target node a third indication regarding the target node's concurrency limit; and determining whether transmitting the packet would violate the target node's concurrency limit based on the first and second indications.

Example 23 includes the subject matter of Example 17, and optionally, wherein the operations further include flagging the packet as an out-of-range packet.

Example 24 includes the subject matter of Example 17, and optionally, wherein the operations further include moving the packet stored in the retransmit buffer to an in-window state before transmitting the packet.

Example 25 includes a system comprising: a first device; and a plurality of second devices connected to the first device through a network fabric. The first device comprises a network interface controller to: generate packets for transmission to respective ones of the plurality of second devices; for each packet addressed to its corresponding second device: determine whether transmitting the packet would violate the second device's concurrency limit, if transmitting the packet would not violate the second device's concurrency limit, transmit the packet to the second device, and if transmitting the packet would violate the second device's concurrency limit, store the packet in a retransmit buffer of the first device, the retransmit buffer to further store already transmitted packets flagged for retransmission, and transmit the packet from the retransmit buffer when transmitting the packet from the retransmit buffer would not violate the second device's concurrency limit. The second device is to update the first device regarding whether or not the packet was received.

Example 26 includes the system of Example 25, and optionally, wherein the network interface controller of the first device is to generate, for transmission to each of the plurality of second devices, a stream of contiguously sequenced packets in a packet sequence number (PSN) space.

Example 27 includes the system of Example 26, and optionally, wherein the concurrency limit corresponds to a Maximum Sequence Distance Limit (MSDL) of the second device.

Example 28 includes the system of Example 25, and optionally, wherein the concurrency limit corresponds to a Maximum Number of Missing Packets (MNMP) for the second device.

Example 29 includes the system of Example 25, and optionally, wherein the second device is to send to the first device a first indication regarding received packets from the first device, and a second indication regarding packets not received from the first device, the network interface controller of the first device to determine whether transmitting the packet would violate the second device's concurrency limit based on the first and second indications.

Example 30 includes the system of Example 29, and optionally, wherein the second device is to send to the first device a third indication regarding the second device's concurrency limit, the network interface controller of the first device to determine whether transmitting the packet would violate the second device's concurrency limit further based on the third indication.

Example 31 includes the system of Example 25, and optionally, wherein network interface controller of the first device is to flag the packet as an out-of-range packet as part of storing the packet in the retransmit buffer.

Example 32 includes the system of Example 25, and optionally, wherein the second device is to send to the first device one or more ACKs for one or more packets transmitted from the first device to the second device, and wherein the first device is to move the packet stored in the retransmit buffer to an in-window state before transmitting the packet after receiving the one or more ACKs.

Example 33 includes the system of Example 25, and optionally, further comprising one or more of: a battery communicatively coupled to the first device and the second device; or a display communicatively coupled to the first device and the second device.

Example 34 includes the system of Example 25, and optionally, wherein: the first device is a source node; and the second device is a target node.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A computing device including:
   a memory device; and
   a network interface controller coupled to the memory device and including circuitry to communicate with a plurality of target nodes in a network fabric, the circuitry to:
      generate packets for transmission to respective ones of the target nodes;
      for each packet addressed to its corresponding target node:
         determine whether transmitting the packet would violate the target node's concurrency limit, wherein the concurrency limit is at least partially based on a maximum number of packets in flight that are trackable by the target node within a contiguous block of sequenced packets in flight and/or a maximum number of missing packets the target node can track;
         if transmitting the packet would not violate the target node's concurrency limit, transmit the packet to the target node;
         if transmitting the packet would violate the target node's concurrency limit:
            store the packet in a retransmit buffer for the target node, the retransmit buffer being separate from a transmit buffer for the target node; and
            transmit the packet from the retransmit buffer when transmitting the packet from the retransmit buffer would not violate the target node's concurrency limit.

2. The computing device of claim 1, wherein the circuitry to generate, for transmission to each of the plurality of target nodes, a stream of contiguously sequenced packets in a packet sequence number (PSN) space.

3. The computing device of claim 2, wherein the concurrency limit corresponds to a Maximum Sequence Distance Limit (MSDL) of the target node.

4. The computing device of claim 1, wherein the concurrency limit corresponds to a Maximum Number of Missing Packets (MNMP) for the target node.

5. The computing device of claim 1, wherein the circuitry is to receive from the target node a first indication regarding received packets, and a second indication regarding packets not received, the circuitry to determine whether transmitting the packet would violate the target node's concurrency limit based on the first and second indications.

6. The computing device of claim 5, wherein the circuitry is to receive from the target node a third indication regarding the target node's concurrency limit, the circuitry to determine whether transmitting the packet would violate the target node's concurrency limit based on the first, second and third indications.

7. The computing device of claim 1, wherein the circuitry is to flag the packet as an out-of-range packet as part of storing the packet in the retransmit buffer.

8. The computing device of claim 1, wherein the computing device is to move the packet stored in the retransmit buffer to an in-window state before transmitting the packet.

9. A method to transmit packets from a computing device in a network fabric, the method including:
   generating packets for transmission to respective ones of a plurality of target nodes; and
   for each packet addressed to its corresponding target node:
      determining whether transmitting the packet would violate the target node's concurrency limit, wherein the concurrency limit is at least partially based on a maximum number of packets in flight that are trackable by the target node within a contiguous block of sequenced packets in flight and/or a maximum number of missing packets the target node can track;
if transmitting the packet would not violate the target node's concurrency limit, transmitting the packet to the target node;
if transmitting the packet would violate the target node's concurrency limit:
storing the packet in a retransmit buffer for the target node, the retransmit buffer being separate from a transmit buffer for the target node, and to store already transmitted packets flagged for retransmission; and
transmitting the packet from the retransmit buffer when transmitting the packet from the retransmit buffer would not violate the target node's concurrency limit.

10. The method of claim 9, further including generating, for transmission to each of the plurality of target nodes, a stream of contiguously sequenced packets in a packet sequence number (PSN) space.

11. The method of claim 10, wherein the concurrency limit corresponds to a Maximum Sequence Distance Limit (MSDL) of the target node.

12. The method of claim 9, wherein the concurrency limit corresponds to a Maximum Number of Missing Packets (MNMP) for the target node.

13. The method of claim 9, further including:
receiving from the target node a first indication regarding received packets, and a second indication regarding packets not received; and
determining whether transmitting the packet would violate the target node's concurrency limit based on the first and second indications.

14. The method of claim 13, further including:
receiving from the target node a third indication regarding the target node's concurrency limit; and
determining whether transmitting the packet would violate the target node's concurrency limit based on the first, second and third indications.

15. The method of claim 9, wherein storing includes flagging the packet as an out-of-range packet.

16. The method of claim 9, further including moving the packet stored in the retransmit buffer to an in-window state before transmitting the packet.

17. A product comprising one or more tangible computer-readable non-transitory storage media comprising computer-executable instructions operable to, when executed by at least one computer processor, enable the at least one computer processor to implement operations at a computing device, the operations including:
generating packets for transmission to respective ones of a plurality of target nodes; and
for each packet addressed to its corresponding target node:
determining whether transmitting the packet would violate the target node's concurrency limit, wherein the concurrency limit is at least partially based on a maximum number of packets in flight that are trackable by the target node within a contiguous block of sequenced packets in flight and/or a maximum number of missing packets the target node can track;
if transmitting the packet would not violate the target node's concurrency limit, transmitting the packet to the target node;
if transmitting the packet would violate the target node's concurrency limit:
storing the packet in a retransmit buffer, the retransmit buffer being separate from a transmit buffer for the target node and to store already transmitted packets flagged for retransmission; and
transmitting the packet from the retransmit buffer when transmitting the packet from the retransmit buffer would not violate the target node's concurrency limit.

18. The product of claim 17, wherein the operations further include generating, for transmission to each of the plurality of target nodes, a stream of contiguously sequenced packets in a packet sequence number (PSN) space, and wherein the concurrency limit corresponds to a Maximum Sequence Distance Limit (MSDL) of the target node.

19. The product of claim 17, wherein the concurrency limit corresponds to a Maximum Number of Missing Packets (MNMP) for the target node.

20. The product of claim 17, wherein the operations further include:
receiving from the target node a first indication regarding received packets, and a second indication regarding packets not received; and
determining whether transmitting the packet would violate the target node's concurrency limit based on the first and second indications.

21. The product of claim 20, wherein the operations further include:
receiving from the target node a third indication regarding the target node's concurrency limit; and
determining whether transmitting the packet would violate the target node's concurrency limit based on the first, second and third indications.

22. The product of claim 17, wherein the operations further include flagging the packet as an out-of-range packet.

23. A system comprising:
a first computing device; and
a plurality of second computing devices connected to the first computing device through a network fabric;
wherein:
the first computing device comprises a network interface controller to:
generate packets for transmission to respective ones of the plurality of second computing devices;
for each packet addressed to its corresponding second computing device:
determine whether transmitting the packet would violate the second computing device's concurrency limit, wherein the concurrency limit is at least partially based on a maximum number of packets in flight that are trackable by the second computing device within a contiguous block of sequenced packets in flight and/or a maximum number of missing packets the second computing device can track;
if transmitting the packet would not violate the second computing device's concurrency limit, transmit the packet to the second computing device;
if transmitting the packet would violate the second computing device's concurrency limit:
store the packet in a retransmit buffer for the target node, the retransmit buffer being separate from a transmit buffer for the target node and to store already transmitted packets flagged for retransmission;
transmit the packet from the retransmit buffer when transmitting the packet from the retransmit buffer would not violate the second computing device's concurrency limit; and
the second computing device is to update the first computing device regarding whether or not the packet was received.

24. The system of claim 23, wherein the network interface controller of the first computing device is to generate, for transmission to each of the plurality of second computing devices, a stream of contiguously sequenced packets in a packet sequence number (PSN) space, and wherein the concurrency limit corresponds to a Maximum Sequence Distance Limit (MSDL) of the second computing device.

25. The system of claim 23, wherein the concurrency limit corresponds to a Maximum Number of Missing Packets (MNMP) for the second computing device.

* * * * *